United States Patent [19]

Durbin

[11] Patent Number: 4,551,715
[45] Date of Patent: Nov. 5, 1985

[54] TACHOMETER AND ROTOR IDENTIFICATION APPARATUS FOR CENTRIFUGES

[75] Inventor: Dennis Durbin, Eugene, Oreg.

[73] Assignee: Beckman Instruments, Inc., Fullerton, Calif.

[21] Appl. No.: 605,365

[22] Filed: Apr. 30, 1984

[51] Int. Cl.$^4$ .............................................. G01P 3/481
[52] U.S. Cl. ............................... 340/671; 340/870.29; 340/870.31; 235/464; 250/231 SE; 318/313; 318/327; 324/174; 324/175; 494/9; 494/10
[58] Field of Search .............. 340/671, 870.29, 870.31, 340/672; 324/174, 175; 318/313, 327; 494/9, 10; 250/231 SE; 235/464

[56] References Cited

U.S. PATENT DOCUMENTS

| | | | |
|---|---|---|---|
| 3,462,670 | 8/1969 | Waye | 318/327 |
| 3,582,699 | 6/1971 | Badessa et al. | 318/327 |
| 3,746,247 | 7/1973 | Camilliere | 318/313 |
| 3,982,162 | 9/1976 | Olliffe | 318/327 |
| 4,205,261 | 5/1980 | Franklin | 318/313 |
| 4,257,040 | 3/1981 | Shirasaki et al. | 340/671 |

Primary Examiner—Stewart J. Levy
Assistant Examiner—John E. Chapman, Jr.
Attorney, Agent, or Firm—W. H. May; P. R. Harder; L. D. Rish

[57] ABSTRACT

An apparatus for determining the actual speed and maximum safe speed of a centrifuge rotor. A single circular array of equally spaced coding elements of two clearly distinguishable types is attached to the rotor. A single detector responsive to the coding elements produces an output signal that varies in accordance with both the number and type of the coding elements. A first circuit network is responsive to the number of coding elements encountered per unit time, without regard to type, to produce an actual speed or tachometer signal. A second circuit network is responsive to the number of coding elements of each type encountered during each revolution of the rotor, without regard to the speed thereof, to produce a rotor identification signal that is indicative of the maximum safe speed of the rotor.

29 Claims, 5 Drawing Figures

| NUMBER OF MAGNETS | DB7 | DB6 | DB5 | DB4 | DB3 | DB2 | DB1 | DB0 | HEX VALUE |
|---|---|---|---|---|---|---|---|---|---|
| 6N,0S | 0 | 1 | 1 | 0 | 0 | 0 | 0 | 0 | 60H |
| 5N,1S | 0 | 1 | 0 | 1 | 0 | 0 | 0 | 1 | 51H |
| 4N,2S | 0 | 1 | 0 | 0 | 0 | 0 | 1 | 0 | 42H |
| 3N,3S | 0 | 0 | 1 | 1 | 0 | 0 | 1 | 1 | 33H |
| 2N,4S | 0 | 0 | 1 | 0 | 0 | 1 | 0 | 0 | 24H |
| 1N,5S | 0 | 0 | 0 | 1 | 0 | 1 | 0 | 1 | 15H |
| 0N,6S | 0 | 0 | 0 | 0 | 0 | 1 | 1 | 0 | 06H |

*FIG. 3A*

| NUMBER OF MAGNETS | NO. OF TRANS. | DB7 | DB6 | DB5 | DB4 | DB3 | DB2 | DB1 | DB0 | HEX VALUE |
|---|---|---|---|---|---|---|---|---|---|---|
| 6N,0S | 0T | 0 | 0 | 0 | 1 | 1 | 0 | 0 | 0 | 18H |
| 5N,1S | 2T | 0 | 1 | 0 | 1 | 0 | 0 | 0 | 1 | 51H |
| 4N,2S | 2T | 0 | 1 | 0 | 1 | 0 | 0 | 1 | 0 | 52H |
| 4N,2S | 4T | 1 | 0 | 0 | 1 | 0 | 0 | 1 | 0 | 92H |
| 3N,3S | 2T | 0 | 1 | 0 | 0 | 1 | 0 | 1 | 1 | 4BH |
| 3N,3S | 4T | 1 | 0 | 0 | 0 | 1 | 0 | 1 | 1 | 8BH |
| 3N,3S | 6T | 1 | 1 | 0 | 0 | 1 | 0 | 1 | 1 | CBH |
| 2N,4S | 2T | 0 | 1 | 0 | 0 | 1 | 1 | 0 | 0 | 4CH |
| 2N,4S | 4T | 1 | 0 | 0 | 0 | 1 | 1 | 0 | 0 | 8CH |
| 1N,5S | 2T | 0 | 1 | 0 | 0 | 0 | 1 | 0 | 1 | 45H |
| 0N,6S | 0T | 0 | 0 | 0 | 0 | 0 | 1 | 1 | 0 | 06H |
| | | \_\_TC\_\_ | | | \_\_NC\_\_ | | \_\_SC\_\_ | | CC | |

*FIG. 3B*

TACHOMETER AND ROTOR IDENTIFICATION APPARATUS FOR CENTRIFUGES

BACKGROUND OF THE INVENTION

The present invention relates to centrifuges and is directed more particularly to an improved apparatus for generating signals indicative of the actual speed and maximum safe speed of a centrifuge rotor.

In order to make it possible to perform a variety of different kinds of separations, many centrifuges are designed so that they can operate with any of a variety of different kinds and sizes of rotors. Because any rotor can fail catastrophically or even explode if it is used at a speed in excess of its maximum safe speed, it is important that such centrifuges be able to determine the maximum safe speed of a rotor without having to rely upon the attentiveness of its operator. As a result, such centrifuges are ordinarily equipped with circuits known as rotor identification circuits which are adapted to determine the identity and therefore the maximum safe speed of a rotor from markings such as optically coded bands that appear thereon. One circuit of this type which utilizes three optically coded bands and three photocell detectors is described in U.S. Pat. No. 3,746,247, issued in the name of Camilliere on July 17, 1973. Another circuit of this type which utilizes the arcuate length of a single coding band and one photocell detector is described in U.S. Pat. No. 3,982,162 issued in the name of Olliffe on Sept. 21, 1976.

Accurate control of the speed of a rotor also makes it important that a centrifuge include an accurate tachometer for generating a signal indicative of the actual speed of the rotor. Because of the extremely high speeds at which many centrifuges operate, this tachometer is usually one that has no direct mechanical connection to the rotor. Tachometers of this type may, for example, include an optical detector for detecting the passage of one or more speed control markings that appear on the bottom or periphery of the rotor. Because of their different function, such markings are separate from any rotor identification markings and are monitored by a separate photocell detector and a separate channel of the centrifuge electronics.

While tachometer and rotor identification circuits of the above types are adequate for many applications, they have certain deficiencies which limit the usefulness thereof. One of these is that the optical properties of the speed control and rotor identification markings can deteriorate with time as a result of the accumulation of dirt or of mechanical abrasion. This deterioration of the markings can in some cases result in an erroneous tachometer signal or even in an incorrect rotor identification. The latter errors, in turn, can result in faulty centrifuge separations or even in catastrophic rotor failures.

Another deficiency of circuits of the above type is that they require a multiplicity of different kinds of markings on the rotor, and a corresponding multiplicity of detectors for reading information therefrom. This multiplicity of markings and detectors is reflected by a corresponding multiplicity of channels in the electronics of the centrifuge. This duplication of markings, detectors and channels caused the tachometer and rotor identification circuits of centrifuges to be relatively complicated and expensive.

SUMMARY OF THE INVENTION

The tachometer and rotor identification apparatus of the present invention incorporates a number of improvements which eliminate the above-described deficiencies. One of these improvements is the use of improved signal processing circuitry which allows both the tachometer signal and the rotor identification signal to be generated from a single set of coding elements on the rotor. More particularly, the improved signal processing circuit includes tachometer signal generating circuitry and rotor identification circuitry both of which are connected to receive the pulse train produced by a single detector. The apparatus of the invention is therefore able to accomplish both of its intended functions with fewer detectors and fewer channels of electronic circuitry than previously known centrifuges.

Another of these improvements is the use of a circular array of magnetic coding elements on the rotor with a magnetic detector that is arranged to read the tachometer and rotor identification information which is contained therein. One advantage of using magnetic coding elements and a magnetic detector is that the output of the detector is not appreciably affected by the presence of dirt or by mechanical abrasion. Another is that the output of a magnetic detector conveys information about the magnetic orientation of the magnets sensed thereby. As a result, both the presence of a magnet and the magnetic orientation of that magnet can be used to provide different types of information about the rotor. This property is taken advantage of by using the passage of magnets, without regard to magnetic orientation, to generate a signal indicative of the actual speed of the rotor, and by using the magnetic orientation of the magnets in the array, without regard to rotor speed, to generate a signal indicative of the maximum safe speed of the rotor. Thus, two different types of information are produced by a single channel of coding elements and a single detector.

In the preferred embodiment of the invention there is utilized a rotor identification coding scheme and an associated decoding circuit which allow a relatively large number of different rotors to be identified from a relatively small number of magnets. Advantageously, this coding scheme and decoding circuit provides the desired information in an asynchronous manner, that is, without the use of timing or synchronizing bits. As a result, the circuit of the invention can unambiguously identify a rotor and indicate its speed, from any one complete revolution thereof, without using any synchronizing circuitry. Together these features reduce the cost of the centrifuge circuitry without sacrificing any of the performance required therefrom.

DESCRIPTION OF THE DRAWINGS

Other objects and advantages of the invention will be apparent from the following description and drawings in which:

FIGS. 3a and 3b are coding diagrams which illustrate the coding schemes used in the embodiments of FIGS. 1 and 2.

DESCRIPTION OF THE PREFERRED EMBODIMENTS

Figures 1, 1A:
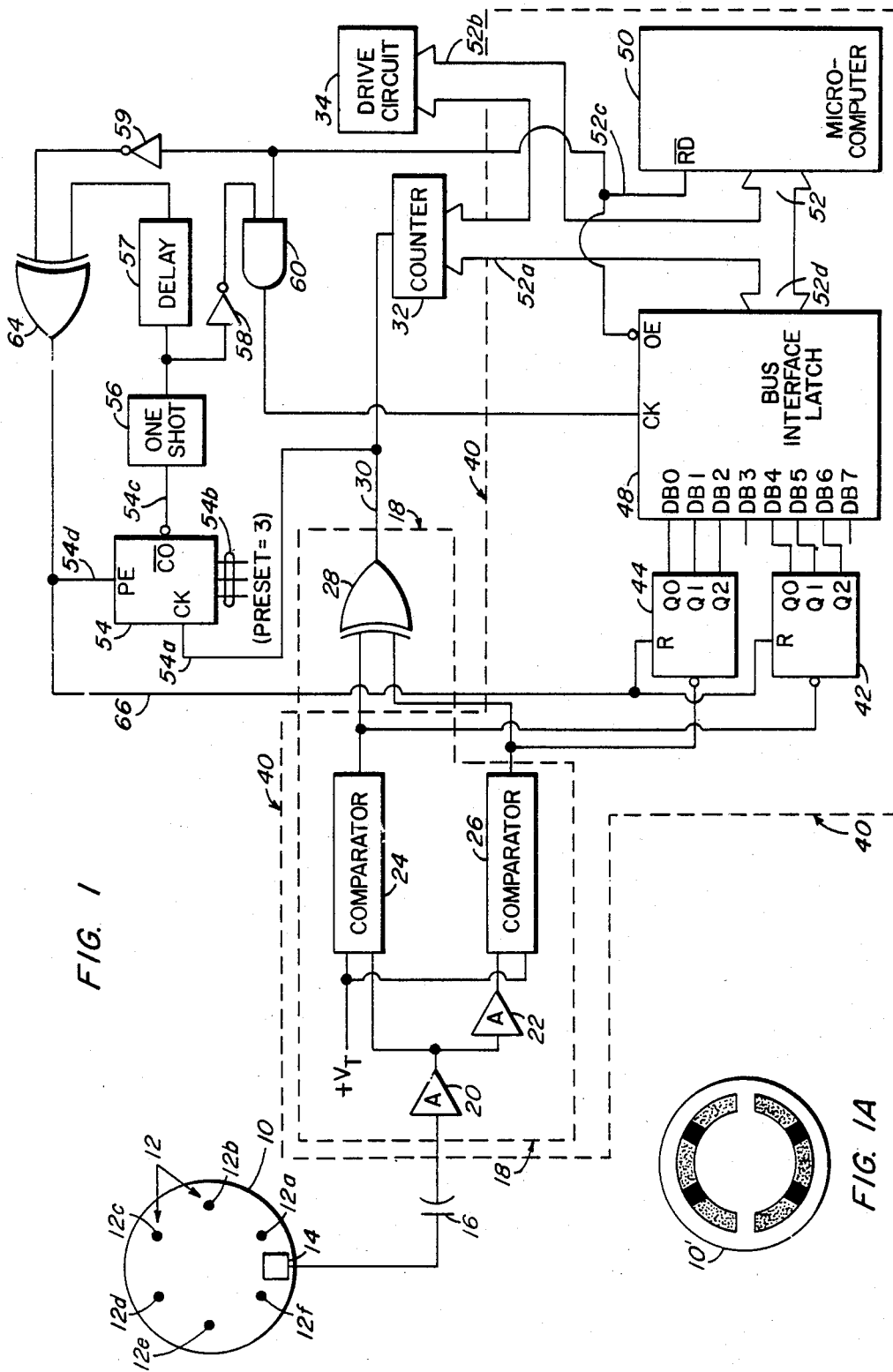
FIG. 1 is a schematic-block diagram of an embodiment of the invention which uses magnetic coding elements to identify up to seven different types of rotors.
FIG. 1A is a plan view of an alternative type of rotor which uses optically readable coding elements.

Referring to FIG. 1, there is shown a simplified bottom view of a centrifuge rotor 10 in which are imbedded a plurality of magnets 12a-f. These magnets each have a north-south magnetic orientation that is generally perpendicular to the plane of the figure. Magnets 12a-12f are preferably equidistant from the central axis of the rotor and are spaced at equal angular intervals. When the magnets are arranged in this manner, they form a circular array 12 each magnet of which may be made to pass under a suitable magnetic detector, such as a Hall effect device 14, each time that rotor 10 undergoes one complete revolution. It will be understood that the total number of magnets in array 12 may be larger or smaller than six, depending upon the particular application.

Because a Hall effect device such as 14 is sensitive to the direction of the magnetic field to which it is exposed, its output can be used to distinguish a north-oriented magnet from a south-oriented magnet. More particularly, the output voltage of detector 14 will increase (become more positive) with respect to the quiescent value thereof when a north-oriented magnet passes thereunder, and will decrease (becomes more negative) with respect to the quiescent value thereof when a south-oriented magnet passes thereunder. As a result, when the output signal of sensor 14 is coupled through a d-c blocking capacitor such as 16, it becomes a signal which is made up of a series of positive and negative pulses, the sequence of the pulses depending upon the sequence of the magnetic orientations of the magnets of array 12. As will be explained more fully presently, the circuit of the invention uses the latter signal to produce both a tachometer or actual speed signal which may be used to control the speed of rotor 10, and a rotor identification signal which may be used to determine the maximum safe speed of rotor 10.

To the end that the output signal of detector 14 may be converted to a two-state digital tachometer signal suitable for use as a feedback signal in a closed loop speed control system, the circuit of FIG. 1 includes a tachometer signal generating network 18. In the embodiment of FIG. 1 this network includes non-inverting and inverting amplifiers 20 and 22, respectively, voltage comparators 24 and 26 and an exclusive-OR gate 28.

In operation, comparator 24 compares the non-inverted output signal of detector 14 to a positive threshold voltage $V_T$ to produce a first digital signal, hereinafter referred to as the north signal, which is in its low state each time that a north-oriented magnet passes under detector 14. Similarly, comparator 26 compares the inverted output signal of detector 14 to positive threshold voltage $V_T$ to produce a second digital signal, hereinafter referred to as the south signal, which is in its low state each time that a south-oriented magnet passes under detector 14. Thus, comparators 24 and 26 separate the output signal of detector 14 into two signals each of which indicates only the passage of magnets that have one orientation.

Upon receiving the north and south signals from comparators 24 and 26, exclusive-OR gate 28 combines the same to apply to conductor 30 a digital tachometer signal that indicates the passage of any magnet under detector 14, without regard to its magnetic orientation. Gate 28 accomplishes this by forcing its output into its high or 1 state when the voltages at its inputs are in different states. Since each magnet of array 12 can only have either a north or a south orientation, however, the voltages at the inputs of gate 28 will be different each time that any magnet passes under detector 14. As a result, gate 28 will apply a high-state pulse to conductor 30 when either a north or a south oriented magnet passes under detector 14. The signal at the output of gate 28 is therefore suitable for use as a tachometer or actual speed signal.

In the embodiment of FIG. 1, the tachometer signal produced by network 18 is applied to a counter 32 which converts it to a multi-bit digital word. This digital word is then periodically read by a microcomputer 50, over branch 52a of an input/output (I/O) bus 52, and used to determine the difference between the actual and desired speed of rotor 10. The difference or speed error is then used to adjust the speed of the rotor as necessary to cause it to run at the desired speed. This adjustment is made by microcomputer 50 by outputting, over branch 52b of bus 52, the necessary speed control signals to the drive circuit 34 which supplies power to the drive motor of the rotor. Because a speed control system of this type is well known, it will not be described in detail herein.

In accordance with an important feature of the present invention, the north/south orientations of the magnets of array 12 are used to define an asynchronous digital rotor identification code which is used to determine the maximum safe operating speed of rotor 10. This rotor identification can also be used to convey information concerning other centrifuge variables such as the temperature at which the rotor is to be used. In the preferred embodiment, this code is selected so that the desired identification may be made without using the orientations of any one or more of the magnets as synchronizing or timing bits. The absence of such bits is desirable because it eliminates the need for circuitry for recognizing the same or for synchronizing the code determination process thereto. Another advantage of the absence of synch bits is that it allows the rotor to be identified from the information produced during any full revolution of rotor 10, without regard to the starting position of the rotor during that revolution.

In the embodiment of FIG. 1 the desired asynchronous coding is based only upon the total number of north and south-oriented magnets which are present in array 12, without regard to the order of those magnets within the array. As will be explained more fully presently, the use of this coding scheme with a six-magnet array allows the circuitry to distinguish seven different kinds of rotors. Stated differently, the coding scheme used in the embodiment of FIG. 1 allows the centrifuge with which it is used to be used with as many as seven different kinds of rotors, each with a different respective maximum safe speed.

In the circuit of FIG. 1 the desired decoding is performed by a decoding network 40 which includes a number of the elements that also form a part of tachometer signal generating network 18. More particularly, decoding network 40 includes amplifiers 20 and 22 and comparators 24 and 26, along with a north counter 42, a south counter 44, a bus interface latch 48 and microcomputer 50. Of these, north counter 42 is connected to count the number of pulses produced by north comparator 24 during each revolution of rotor 10, and south counter 44 is connected to count the number of pulses produced by south comparator 26 during each revolution of rotor 10.

The above counters, which are preferably falling edge triggered BCD counters such as those sold under the designation MC 14518 by Motorola, are connected to apply respective three-bit north and south count signals to inputs DB0–DB7 of bus interface latch 48. When these signals are latched into latch 48, they are effectively packed into an eight-bit digital word which defines a two-digit hexadecimal number. This hexadecimal number may then be read by microcomputer 50 and used to determine the maximum safe speed that is associated with that number. Once the latter speed has been determined, microcomputer 50 can then use it to prevent an operator from entering a speed that is too great for the rotor, or to shut down the centrifuge, via branch 52b of bus 52 and drive circuit 34, if and when it detects a condition in which the actual speed of the rotor exceeds its maximum safe speed.

The manner in which the north and south orientations of the magnets of array 12 are encoded with a two-digit hexadecimal number will now be described with reference to FIG. 3A. In FIG. 3A the left-most column shows the seven different possible combinations of magnetic orientations of the magnets of array 12. In addition, the middle eight columns, labeled DB0 through DB7, show the states of the voltages at the eight similarly numbered inputs of latch 48 after each complete revolution of rotor 10. Finally, the right-most column of FIG. 3A shows the two-digit hexadecimal numbers which correspond to the eight-bit binary values that are shown in columns DB0–DB7.

The fourth entry, for example, shows that a rotor having a magnetic array that includes three north and three south-oriented magnets will cause the four least significant bits DB0–DB3 of latch 48 to contain a 3, and the four most significant bits DB4–DB7 of latch 48 to also contain a 3. As a result, microcomputer 50 will read the hexadecimal number 33 when it inputs the signal from latch 48. Significantly, this same number will be read without regard to the order in which the three north and three south-oriented magnets are arranged within array 12. This is because each magnet is counted only once during each complete revolution of rotor 10, and because any array that includes three north and three south-oriented magnets will cause counters 42 and 44 to count to three during that revolution. This fact illustrates that the circuit of the invention is asynchronous, i.e., does not require synch or timing signals.

Because the most significant bits of the upper and lower four bits of inputs DB0 through DB7 are 0's, it is apparent that the code distinguishing capacity of latch 48 is not fully utilized by the circuit of FIG. 1. If this capacity were fully utilized, it would be necessary to include as many as 16 north magnets and 16 south magnets in array 12, 16 being the number of different combinations of 1's and 0's in each half of the eight-bit word at inputs DB0–DB7. Since the number of different rotors that are used with a particular centrifuge are usually smaller than the number of rotors that could be distinguished by a 32 magnet array, however, it will not ordinarily be necessary to use this larger number of magnets. There is nevertheless no reason in principle why the circuit of the invention could not be used with any desired number of magnets.

In order to assure that counters 42 and 44 provide latch 48 with data that indicates the number of north and south pulses that occur during each complete revolution of the rotor, the circuit of the invention includes suitable clocking and resetting circuitry. In the embodiment of FIG. 1 this circuitry includes a presettable BCD counter 54, a one shot network 56 which generates a high state pulse of predetermined duration each time that it is triggered, a delay network 57, inverters 58 and 59, an AND gate 60, and an exclusive-OR gate 64. Together, these components assure that the contents of counters 42 and 44 are clocked into latch 48 each time that six tachometer pulses have occurred and that counters are then reset in preparation for a new counting sequence. The manner in which this clocking and resetting occurs will now be described.

In the circuit of FIG. 1, the clock input 54a of BCD counter 54 is connected to receive the tachometer signal from gate 28, and the preset input lines 54b thereof are connected to receive signals corresponding to the number 3. In addition, the carry output line 54c of counter 54 is connected to preset enable input 54d thereof through one shot network 56, delay network 57, and exclusive-OR gate 64. Because of these connections, counter 54 will always begin counting at 3, and will produce a low state carry output pulse that will preset its count back to 3 each time that its count reaches the number 9. Since there are six counts between 3 and 9, counter 54 will produce a carry output pulse for each six tachometer pulses, i.e., for each complete revolution of rotor 10. Moreover, since the pulse which gate 64 applies to counter 54 is also applied to the reset inputs of counters 42 and 44, through a conductor 66, counters 42 and 44 will be reset to 0 after each complete revolution of rotor 10. It will therefore be seen that counters 42 and 44 will contain numbers equal to the number of north and south oriented magnets in array 12 after each complete revolution of rotor 10, and will thereafter be reset to 0.

In order to assure that the contents of counters 42 and 44 are stored in latch 48 after each complete revolution of the rotor, carry output 54c of counter 54 is connected to the clock input of latch 48 through one shot network 56, inverter 58 and AND gate 60. This connection assures that, unless microcomputer 50 is applying a low-state rotor identification read pulse to conductor 52c, the contents of counters 42 and 44 will be latched into latch 48 at the conclusion of the output pulse of one shot network 56. As this is occurring, delay network 57 assures that counters 42 and 44 are not reset until after their data has been latched into latch 48. An additional one shot network (not shown) may be connected between delay network 57 and gate 64, if desired, to assure a particular reset time. Thus, unless microcomputer 50 is attempting to read data from latch 48, latch 48 will be caused to receive and store the contents of counters 42 and 44 just before the latter are reset.

When microcomputer 50 is ready to read the rotor identification data from latch 48, it outputs a low-state rotor identification read pulse over conductor 52c. As this pulse begins, it actuates the output enable (OE) input of latch 48 and thereby causes the latter to place its data on branch 52d of bus 52. This read pulse is also applied to exclusive-OR gate 64, through inverter 59, to preset counter 54 and reset counters 42 and 44. Finally, the read pulse is aplied to gate 60 to assure that the data in latch 48 is not changed while it is being read.

Because a rotor cannot be changed while a centrifuge is in operation, it will ordinarily not be necessary for microcomputer 50 to read the rotor identification code after each revolution of the rotor. It is nevertheless desirable for microcomputer 10 to read this code on a regular basis in order to determine whether a failure, such as the detachment of one of the magnets, has occurred. This determination is possible because, if such a failure does occur, there will be a change in the two-digit hexadecimal numbers which are stored in latch 48. Under such a condition, the microcomputer can quickly shut down the centrifuge and thereby prevent possible damage. In accommodating this safety feature, the reading of the rotor identification code as infrequently as once each second may provide all of the data necessary for the centrifuge to operate in the intended manner.

Figure 2:
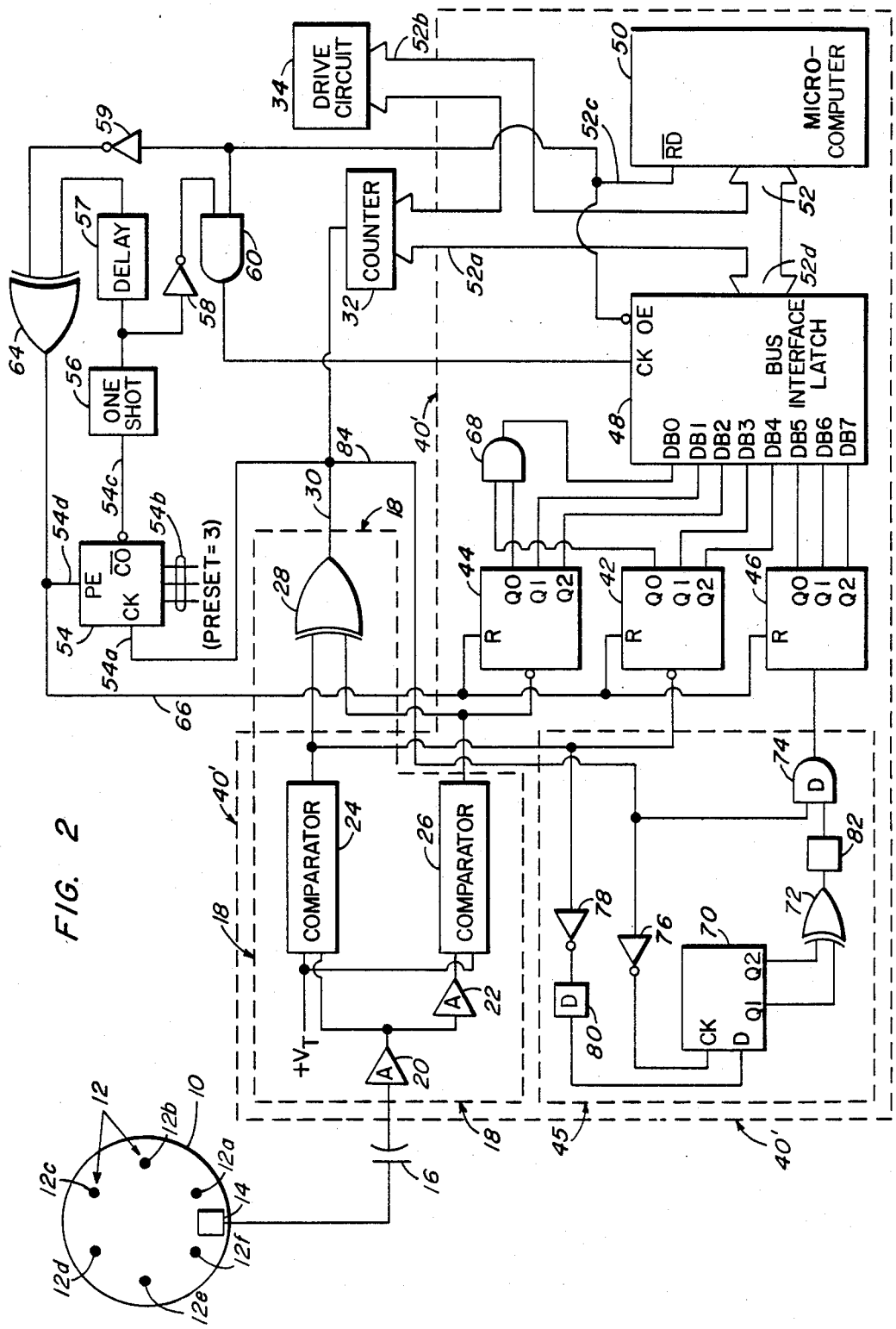
FIG. 2 is a schematic-block diagram of an embodiment of the invention which uses magnetic coding elements to identify up to eleven different types of rotors.

In the event that a centrifuge must be able to operate with more different rotors than can be identified by the circuit of FIG. 1, up to four additional rotors may be identified, without increasing the number of magnets on rotor 10, by utilizing the embodiment of the invention shown in FIG. 2. The circuit of FIG. 2 is generally similar to that of FIG. 1, like functioning parts being similarly numbered. The embodiment of FIG. 2 differs from that of FIG. 1, however, in that it includes a decoding network 40' which counts not only the number of north and south-oriented magnets on the rotor, but also the number of magnetic orientation reversals or transitions that occur during each complete revolution thereof. As will be explained more fully presently, these transitions are detected by a transition detector network 45, and are counted by a transition counter 46. The transition count of counter 46 is then combined with the counts of north and south counters 42 and 44 to produce an eight-bit digital word which microcomputer 50 can use to distinguish up to 11 different rotors.

The coding scheme used in the embodiment of FIG. 2 is most easily understood with reference to the coding diagram shown in FIG. 3B. In FIG. 3B, the left-most column gives the total number of north and south oriented magnets in array 12. The next left-most column gives the total number of magnetic orientation reversals or transitions which occur during each complete revolution of the rotor. From a comparison of these columns, it is apparent that there are several combinations of north-south magnet numbers which can be distinguished from one another on the basis of the number of transitions that are associated therewith. Rotors having three north and three south magnets, for example, can be separated into three different subtypes, namely: those having two transitions, those having four transitions and those having six transitions. Similarly, those rotors which have four magnets with one orientation and two magnets with the other can each be separated into two subtypes on the basis of whether they have two or four transitions. Because of these different sub-types, the total number of rotors which may be identified by the coding scheme of FIG. 3B is 11.

The coding diagram of FIG. 3B also includes eight columns labeled DB0-DB7 which show the combinations of 1's and 0's which are applied to latch 48 for each different combination of north-south magnet numbers and transitions listed in the two left-most columns. Finally, the coding diagram of FIG. 3B includes a column which shows the eleven two-digit hexadecimal numbers which correspond to the eleven eight-bit digital words that are listed under columns DB0 through DB7.

Because the embodiment of FIG. 2 packs the outputs of three different counters into an eight-bit digital word, the connections of the counters to latch 48 follow a pattern different from that described in connection with FIG. 3A. In the embodiment of FIG. 2, the packing of the counter outputs is based on the use of three bits (designated TC) to store the three least significant bits of transition counter 46. The next four bits of the digital word are used to store the two next to least most significant bits of north counter 42 (designated NC) and the two next to least most significant bits of south counter 44 (designated SC). The final bit of the digital word is used to store a bit that represents the combination of the two least significant bits of the north and south counters and is designated CC. The latter bit is produced by an AND gate 68 which is present in FIG. 2 but not in FIG. 1. Together, these packed bits make possible the identification of all of the 11 different kinds of rotors shown in FIG. 3B.

The manner in which transition detector network 45 counts the number of transitions which occur during each complete revolution of rotor 10 will now be described. In the embodiment of FIG. 2, transition detector network 45 includes a shift register 70, an exclusive-OR gate 72, an AND gate 74, inverters 76 and 78 and delay networks 80 and 82. During operation, the north signal produced by comparator 24 is applied through inverter 78 and delay network 80 to the data input of shift register 70. This signal is clocked through shift register 70 by the tachometer signal, which is applied to the clock input of shift register 70 through a conductor 84 and inverter 76. As a result of this clocking, outputs Q1 and Q2 of shift register 70 always store two successive states of the output of comparator 24, i.e., the comparator states that are produced as successive pairs of magnets pass under detector 14. If both of these magnets had a north orientation, outputs Q1 and Q2 will both contain a 1, causing exclusive-OR gate 72 to output a 0. Similarly, if both of these magnets had a south orientation, outputs Q1 and Q2 will both contain a 0, again causing exclusive-OR gate 72 to output a 0. When two successive magnets having different orientations pass under sensor 14, however, outputs Q1 and Q2 will have opposite states, causing exclusive-OR gate 72 to output a 1. Thus, the output of exclusive-OR gate 72 will be a 1 each time that the rotation of rotor 10 indicates a magnetic orientation transition.

The pulses produced by exclusive-OR gate 72 are preferably applied to transition counter 46 through an AND gate 74 which ANDs these pulses with the tachometer signal. This ANDing assures that the transition counter 46 is clocked in synchronism with the tachometer signal. Since the tachometer signal also initiates the transitions which clock north and south counters 42 and 44, this synchronism assures that all of the counters change their counts at substantially the same time. This, in turn, assures that all of counters are updated with each new tach pulse.

While the embodiments of FIGS. 1 and 2 use magnetic coding elements, the practice of the invention is not limited to use with such elements. The invention could, for example, be practiced with optically readable coding elements and an optical detector. In such an embodiment, the coding array would include a circular track having coding elements that can be distinguished into one of two types on the basis of whether their reflectivity is greater or less than that of the part of the track that is located between the coding elements. The appearance of a rotor 10' which has such an array is shown in FIG. 1A. Because of the tendency of the output of such an array to be effected by dirt and scratches, however, such embodiments are not preferred embodiments of the present invention.

In view of the foregoing, it will be seen that a tachometer and rotor identification circuit constructed in accordance with the present invention provides a number of advantages over the most nearly similar prior circuits. Firstly, the circuit of the invention provides both the desired tachometer signal and the desired rotor identification signal with only a single channel of coding elements and a single detector. Secondly, because the circuit of the invention is asynchronous, none of the coding elements are used as synchronizing or timing bits. This, in turn, makes all of the available coding elements available for use in distinguishing different kinds of rotors, thereby reducing the total number of coding elements that must be used. Thirdly, because both the coding elements and the detector are magnetic, the circuit of the invention is not affected by factors such as dirt accumulations and scratches that affect optically coded rotors. Thus, the invention provides improved performance from a circuit of reduced complexity and cost.

What is claimed is:

1. An apparatus for determining the actual speed and the maximum safe speed of a centrifuge rotor, comprising:
   (a) a plurality of coding elements of first and second types attached to the rotor, the number of coding elements of each type defining a code which indicates the maximum safe speed of the rotor,
   (b) a detector responsive to said coding elements for generating an output signal that varies in accordance with the number and type of said coding elements,
   (c) first signal processing means responsive to the number of coding elements for generating a signal indicative of the actual speed of the rotor, and
   (d) second signal processing means responsive to the types of the coding elements for generating a signal indicative of the maximum safe speed of the rotor.

2. The apparatus of claim 1 in which the coding elements form a single circular track which is centered on the axis of rotation of the rotor.

3. The apparatus of claim 2 in which the coding elements are spaced at equal angular intervals around said track.

4. The apparatus of claim 1 in which the first signal processing means includes means for separating the output signal into first and second signals indicative of the numbers of coding elements of said first and second types, and means for combining said first and second signals into a signal indicative of the actual speed of the rotor.

5. The apparatus of claim 1 in which the second signal processing means includes means for separating the output signal into first and second signals indicative of the numbers of coding elements of said first and second types, and means for determining the maximum safe speed of the rotor from said numbers.

6. An apparatus for determining the actual speed and the maximum safe speed of a centrifugal rotor, comprising:
   (a) a circular array of magnets attached to the rotor, the north south orientations of the magnets in said array defining a code indicative of the maximum safe speed of the rotor,
   (b) a magnetic detector responsive to said magnets for generating an output signal which is indicative of the magnetic orientations of said magnets,
   (c) signal generating means responsive to said output signal for generating an actual speed signal indicative of the actual speed of the rotor, and
   (d) decoding means responsive to said output signal for decoding said code to determine the maximum safe speed of the rotor.

7. The apparatus of claim 6 in which the magnets of the array are spaced at equal angular intervals.

8. The apparatus of claim 6 in which the signal generating means comprises means for generating a pulse train having a frequency that varies in accordance with the total number of magnets in the array, without regard to the magnetic orientations of those magnets.

9. The apparatus of claim 6 in which the decoding means includes means for counting the number of north and south oriented magnets that pass the detector during each complete revolution of the rotor, without regard to the speed of the rotor.

10. The apparatus of claim 6 in which the code is based on the number of magnets in the array that have a north orientation and on the number of magnets in the array that have a south orientation.

11. The apparatus of claim 6 in which the code is also based on the number of magnetic orientation transitions in the array.

12. The apparatus of claim 6 in which the decoding means includes a computer for storing the maximum safe speeds that are associated with each of a plurality of different codes, said computer being programmed to (i) read said code on a recurrent basis and (ii) determine the maximum safe speed that is associated with said code.

13. The apparatus of claim 6 in which the magnetic detector is a Hall effect detector.

14. The apparatus of claim 6 in which the signal generating means includes means for separating the output signal into a north signal indicative of the number of north oriented magnets in the array and a south signal indicative of the number of south oriented magnets in the array, and means for combining the north and south signals to produce said actual speed signal.

15. The apparatus of claim 6 in which the decoding means includes means for separating the output signal into a north signal indicative of the number of north oriented magnets in the array and a sourth signal indicative of the number of south oriented magnets in the array, a north counter connected to receive the north signal for counting the number of north oriented magnets in the array, and a south counter connected to receive the south signal for counting the number of south oriented magnets in the array.

16. The apparatus of claim 15 in which the decoding means includes means for storing the contents of said counters after each complete revolution of the rotor.

17. The apparatus of claim 16 further including means for resetting the counters after each complete revolution of the rotor.

18. The apparatus of claim 6 in which both the signal generating means and the decoding means both include means for separating the output signal into a north signal indicative of the number of north oriented magnets in the array, and a south signal indicative of the number of south oriented magnets in the array.

19. The apparatus of claim 15 in which the decoding means also includes transition detecting means for generating a transition signal indicative of the number of magnetic orientation transitions in the array, and a transition counter for counting the number of transitions indicated by the transition signal.

20. The apparatus of claim 15 in which the decoding means includes a computer for storing the maximum safe speeds that are associated with a plurality of different codes, said computer being programmed to: (i) read the code from said counters on a recurrent basis and (ii) determine the maximum speed that is associated with that code.

21. The apparatus of claim 19 in which the decoding means includes a computer for storing the maximum safe speeds that are associated with each of a plurality of different codes, said computer being programmed to: (i) read the code from said counters on a recurrent basis and (ii) determine the maximum speed that is associated with that code.

22. An apparatus for determining the actual speed and the maximum safe speed of a centrifuge rotor, comprising:
   (a) a circular array of magnets attached to the rotor, the north south orientations of the magnets in said array defining a code indicative of the maximum safe speed of the rotor,
   (b) a magnetic detector responsive to said magnets for generating an output signal which is indicative of the magnetic orientations of the magnets.
   (c) first means for separating the output signal into a north signal indicating the detection of north oriented magnets and a south signal indicating the detection of south oriented magnets,
   (d) second means connected to said first means for generating an actual speed signal that varies in accordance with the detection of north or south oriented magnets.
   (e) north counting means connected to receive the north signal for counting the number of north oriented magnets in the array,
   (f) south counting means connected to receive the south signal for counting the number of such oriented magnets in the array, and
   (g) programmable control means connected to the north and sourth counting means for determining the maximum safe speed of the rotor from the number of north and south oriented magnets.

23. The apparatus of claim 22 in which the magnets of the array are spaced at equal angular intervals.

24. The apparatus of claim 22 further including transition counting means for counting the number of magnetic orientation transition in the array.

25. The apparatus of claim 24 in which the programmable control means is connected to the transition counting means and determines the maximum safe speed of the rotor from the number of transitions counted thereby as well as from the number of magnets counted by the north and south counting means.

26. The apparatus of claim 22 in which the north and south signals are digital signals and in which the second means comprises an exclusive-OR gate.

27. The apparatus of claim 22 in which the output signal comprises of a succession of pulses of opposite polarities, and in which the first means comprises means for separating said pulses in accordance with their polarity.

28. The apparatus of claim 22 including means for storing the contents of the counting means after each complete revolution of the rotor.

29. The apparatus of claim 28 including means for resetting the counting means after each complete revolution of the rotor.

* * * * *

UNITED STATES PATENT AND TRADEMARK OFFICE
CERTIFICATE OF CORRECTION

PATENT NO. : 4,551,715
DATED : November 5, 1985
INVENTOR(S) : Dennis Durbin

It is certified that error appears in the above-identified patent and that said Letters Patent is hereby corrected as shown below:

Column 12, line 5,     "such" should be deleted and the word --south-- should be inserted.

Signed and Sealed this
Second Day of December, 1986

*Attest:*

DONALD J. QUIGG

*Attesting Officer*      *Commissioner of Patents and Trademarks*